(12) United States Patent
Williams

(10) Patent No.: US 9,315,209 B1
(45) Date of Patent: Apr. 19, 2016

(54) HYDRAULICALLY ASSISTED STEERING SYSTEM

(71) Applicant: TRW Automotive U.S. LLC, Livonia, MI (US)

(72) Inventor: Daniel E. Williams, Lebanon, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 14/596,328

(22) Filed: Jan. 14, 2015

(51) Int. Cl.
*B62D 5/06* (2006.01)
*B62D 5/065* (2006.01)
*F04B 11/00* (2006.01)

(52) U.S. Cl.
CPC ............. *B62D 5/065* (2013.01); *B62D 5/062* (2013.01); *F04B 11/00* (2013.01); *F04B 11/0091* (2013.01)

(58) Field of Classification Search
CPC ........ B62D 5/065; B62D 5/062; F04B 11/00; F04B 11/0091
USPC .................. 180/422, 407; 417/307
See application file for complete search history.

(56) References Cited

U.S. PATENT DOCUMENTS

| 5,492,451 | A | 2/1996 | Franz et al. | |
| 5,975,233 | A * | 11/1999 | Eisenbacher | B62D 5/07 180/417 |
| 7,055,644 | B2 * | 6/2006 | Merz | B62D 5/065 180/402 |
| 2012/0020807 | A1 | 1/2012 | Fernholz et al. | |
| 2014/0069734 | A1 | 3/2014 | Williams | |

* cited by examiner

*Primary Examiner* — Anne Marie Boehler
*Assistant Examiner* — Marlon Arce
(74) *Attorney, Agent, or Firm* — Tarolli, Sundheim, Covell & Tummino LLP

(57) ABSTRACT

A hydraulically assisted steering system comprises a fixed displacement hydraulic pump fluidly connected to a steering gear to deliver pressurized fluid to the steering gear. The flow of pressurized fluid includes pressure pulses produced by the pump. A bypass valve diverts a portion of the flow of pressurized fluid away from the steering gear before reaching the steering gear. Valve control apparatus electrically connected to the bypass controls operation of the bypass valve. The valve control apparatus includes a piezoelectric element to which the pressure pulses are applied. The piezoelectric element produces electrical signals in response to the applied pressure pulses. The valve control apparatus controls operation of the bypass valve in response to at least one parameter of the electrical signals.

12 Claims, 2 Drawing Sheets

HYDRAULICALLY ASSISTED STEERING SYSTEM

TECHNICAL FIELD

The present invention relates to a hydraulically assisted steering system.

BACKGROUND OF THE INVENTION

In a known power steering system, an engine driven pump provides a fixed volume of fluid output per revolution of the pump impeller during operation of the pump. Therefore, the rate of flow of fluid from the engine driven pump is proportional to engine speed. The pump in this known power steering system is sized to provide an acceptable rate of fluid flow when the engine is idling.

A known power steering motor assembly has an open center valve, which requires a constant rate of fluid flow independent of engine speed. In order to obtain a constant rate of fluid flow independent of engine speed, a known power steering system utilizes a flow control valve having a spring loaded valve spool, which is moved to maintain a constant pressure drop across a control orifice.

SUMMARY OF THE INVENTION

In a representative embodiment of the present invention, a hydraulically assisted steering system for turning steerable wheels comprises a steering gear operatively connected to a steering wheel and to a set of steerable wheels to effect turning of the steerable wheels in response to rotation of the steering wheel. The steering system also comprises a fixed displacement hydraulic pump fluidly connected to the steering gear to deliver a flow of pressurized fluid to the steering gear. The flow of pressurized fluid includes pressure pulses produced by the pump. The steering system further comprises a bypass valve to divert a portion of the flow of pressurized fluid from the pump away from the steering gear before the portion of the flow reaches the steering gear. The steering system still further comprises valve control apparatus electrically connected to the bypass valve to control operation of the bypass valve. The valve control apparatus includes a piezoelectric element to which the pressure pulses are applied. The piezoelectric element produces electrical signals in response to the applied pressure pulses. The valve control apparatus controls operation of the bypass valve in response to at least one parameter of the electrical signals.

In another representative embodiment of the present invention, a hydraulically assisted steering system for turning steerable wheels comprises a steering gear operatively connected to a steering wheel and to a set of steerable wheels to effect turning of the steerable wheels in response to rotation of the steering wheel. The steering system also comprises a fixed displacement hydraulic pump fluidly connected to the steering gear to deliver a flow of pressurized fluid to the steering gear. The flow of pressurized fluid includes pressure pulses produced by the pump. The steering system further comprises a bypass valve to divert a portion of the flow of pressurized fluid from the pump away from the steering gear before the portion of the flow reaches the steering gear. The steering system still further comprises valve control apparatus electrically connected to the bypass valve to control operation of the bypass valve. The valve control apparatus includes a sensor to obtain values of at least one parameter related to the pressure pulses. The valve control apparatus produces electrical signals in response to the values obtained by the sensor. The valve control apparatus controls operation of the bypass valve in response to the values obtained by the sensor.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF EMBODIMENTS

Figure 1:
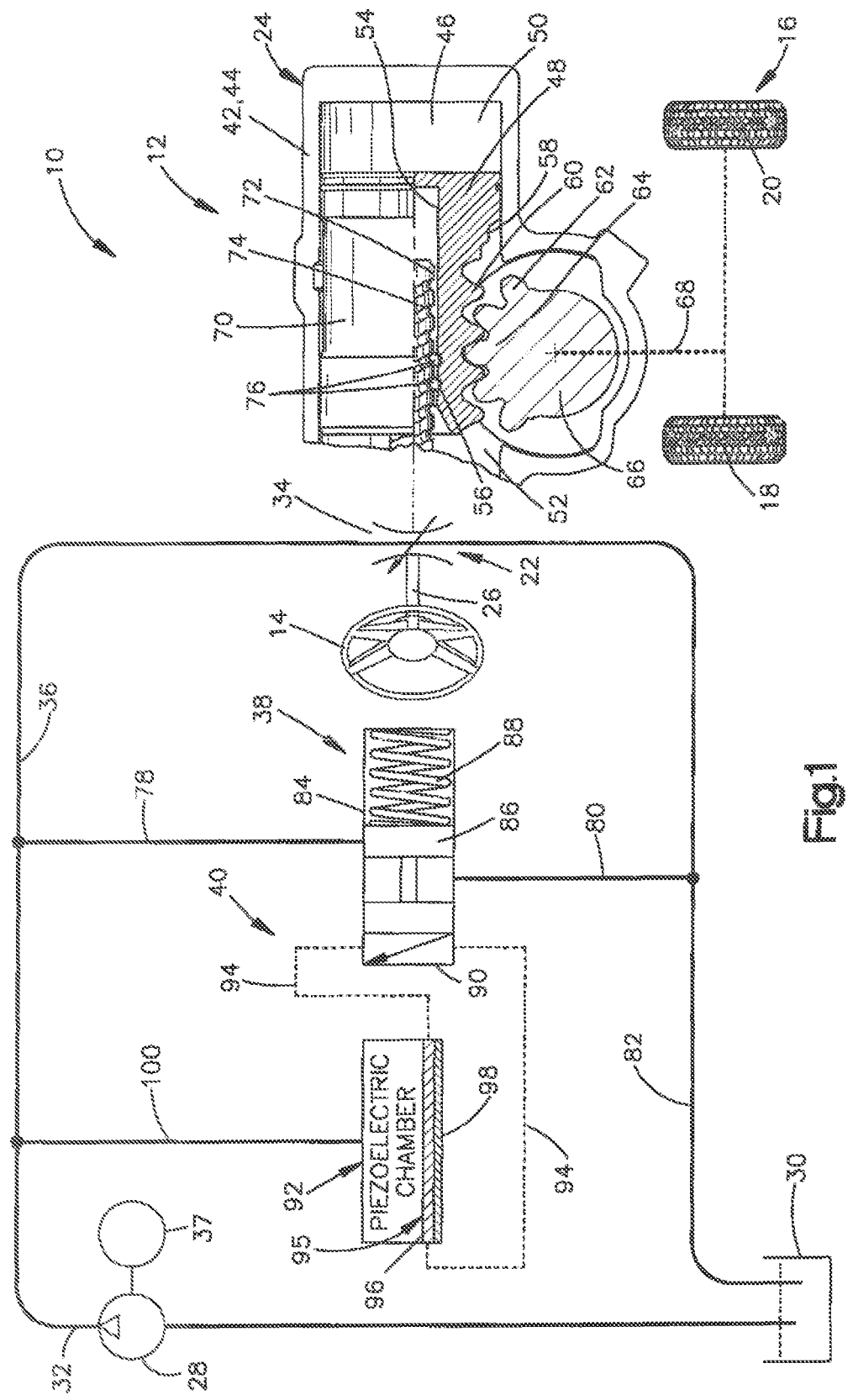
FIG. 1 is a schematic view of a steering system constructed in accordance with an example embodiment of the present invention.

FIG. 1 illustrates a hydraulically assisted steering system 10 for a vehicle (not shown), in accordance with an example of the present invention. The hydraulically assisted steering system 10 comprises a hydraulic power steering gear 12 operatively connected to a manually rotatable vehicle steering wheel 14. The steering gear 12 is also operatively connected to a set 16 of steerable vehicle wheels 18 and 20. The steering gear 12 includes a steering control valve 22 and a hydraulic fluid motor 24. The vehicle steering wheel 14 is connected to the steering control valve 22 through a rotatable steering column assembly 26.

A fixed displacement pump 28 delivers pressurized hydraulic fluid to the steering gear 12 from a fluid reservoir 30. A fluid outlet 32 of the fixed displacement pump 28 is fluidly connected or connected in fluid communication with a fluid inlet 34 of the steering control valve 22 by a fluid supply conduit 36. The fixed displacement pump 28 is continuously driven by an engine 37 of the vehicle, during operation of the engine. Therefore, during operation of the engine 37, the fixed displacement pump 28 continuously supplies fluid under pressure to the steering gear 12.

A bypass valve 38 diverts a portion of the flow of pressurized fluid from the fixed displacement pump 28 away from the steering gear 12 and to the fluid reservoir 30 before the portion of the flow reaches the steering gear. The portion of the flow is diverted because the fixed displacement pump 28 is operated by the vehicle engine 37 and, therefore, delivers increased fluid flow to the fluid outlet 32 and the steering system 10 with increased engine speed. The increased fluid flow is not required by the steering system 10. A valve control apparatus 40 controls operation of the bypass valve 38 in a manner that will be described in greater detail below.

The steering gear 12 is an integral hydraulic power steering gear that incorporates both the hydraulic fluid motor 24 and the steering control valve 22. The steering control valve 22 is an open center valve. The steering control valve 22 directs hydraulic fluid flow to actuate the hydraulic fluid motor 24, as is known in the art.

The steering gear 12 includes a housing 42 that forms a hydraulic cylinder 44. The cylinder 44 defines an internal chamber 46 that receives a piston 48. The piston 48 divides the chamber 46 into a first chamber portion 50 and a second chamber portion 52. Together, the cylinder 44 and the piston 48 comprise the hydraulic fluid motor 24.

The piston 48 includes an inner surface 54 that defines a bore extending axially into the piston 48 from one end. The inner surface 54 includes a helical groove 56. The piston 48 also has an external surface 58 that includes a set of external teeth 60. The teeth 60 mesh with teeth 62 on a sector gear 64. The sector gear 64 is fixed to an output shaft 66, which extends outwardly from the housing 42. The output shaft 66 is connected to a pitman arm (not shown) which, in turn, is connected via a linkage 68 to the set 16 of steerable vehicle wheels 18 and 20 to steer the vehicle (not shown). As the piston 48 moves in the chamber 46, the output shaft 66 is rotated to operate the linkage 68, which turns the steerable vehicle wheels 18 and 20.

The steering control valve 22 directs the flow of pressurized hydraulic fluid received from the fixed displacement pump at the fluid inlet 34 of the steering control valve to one of the first and second chamber portions 50 and 52 to control the direction and amount of steering. As is known in the art, the steering control valve 22 comprises first and second valve members. The first valve member comprises a rotatable valve core (not shown). The second valve member comprises a rotatable valve sleeve 70. The valve core (not shown) is located coaxially within the valve sleeve 70 and is supported by the valve sleeve for limited rotation relative to the valve sleeve. The valve core is formed in one piece with a rotatable input shaft (not shown) of the steering gear 12.

As is also known in the art, the valve sleeve 70 is partially received within the bore of the piston 48. An outer surface 72 of the valve sleeve 70 includes a helical groove 74. The helical groove 74 of the valve sleeve 70 and the helical groove 56 of the piston 48 receive balls 76, which both mechanically connect the valve sleeve and the piston and also permit the valve sleeve to rotate relative to the piston. As a result, rotational movement of the valve sleeve 70 relative to the piston 48 produces axial or longitudinal movement of the piston in the cylinder 42. Conversely, axial or longitudinal movement of the piston 48 in the cylinder 42 produces rotational movement of the valve sleeve 70 relative to the piston.

The steering control valve 22 is actuated by the rotatable steering column assembly 26, which is connected to the input shaft (not shown) of the steering gear 12. The rotatable steering column assembly 26 is rotated by the vehicle steering wheel 14. As is known in the art, rotation of the vehicle steering wheel 14 is transmitted via the steering column assembly 26 to the steering control valve 22 to cause relative rotation between the valve core (not shown) and the valve sleeve 70. When the valve core (not shown) is rotated relative to the valve sleeve 70, hydraulic fluid is ported or directed through grooves (not shown) and associated passages (not shown) in the valve core and valve sleeve to one of the first and second chamber portions 50 and 52, while hydraulic fluid is simultaneously vented or directed away from the other chamber portion. The steering control valve 22 is thus fluidly connected to or in fluid communication with the hydraulic fluid motor 24 such that the steering control valve directs pressurized fluid to the hydraulic fluid motor and allows fluid to return from the hydraulic fluid motor. Porting of the pressurized hydraulic fluid to one of the first and second chamber portions 50 and 52 and venting of hydraulic fluid from the other of the first and second chamber portions causes corresponding movement of the piston 48 (to the left or to the right, as viewed in FIG. 1).

As previously stated, the bypass valve 38 diverts a portion of the flow of pressurized fluid from the fixed displacement pump 28 away from the steering gear 12 and to the fluid reservoir 30 before the portion of the flow reaches the steering gear. The portion of the flow is diverted because the increased fluid flow from the fixed displacement pump 28 resulting from an increase in engine speed is not required by the steering system 10. The bypass valve 38 is interposed in fluid communication with a first fluid bypass conduit 78 and a second fluid bypass conduit 80. The first fluid bypass conduit 78 fluidly connects the bypass valve 38 with the fluid supply conduit 36 from the fixed displacement pump 28. The second fluid bypass conduit 80 fluidly connects the bypass valve 38 with a fluid return conduit 82 that is fluidly connected to or in fluid communication with the fluid reservoir 30.

As shown schematically in FIG. 1, the bypass valve 38 includes a valve housing 84 and a valve spool 86 that is movable lengthwise in the housing. A coil spring 88 disposed at one end of the valve spool 86 resiliently biases the valve spool in one lengthwise direction (to the left, as viewed in FIG. 1) in the valve housing 84. The valve spool 86 is thus resiliently biased to a closed position in which the valve spool blocks the flow of fluid from the first fluid bypass conduit 78 through the bypass valve 38. Adjacent the opposite end of the valve spool 86, an electrically operable valve actuator 90, such as a solenoid, operates to move the valve spool in an opposite lengthwise direction (to the right, as viewed in FIG. 1) in the valve housing 84 against the bias of the spring 88. The valve spool 86 is thus operated by the valve actuator 90 to an open position in which the valve spool allows a flow of fluid from the first fluid bypass conduit 78 to pass through the bypass valve 38. Depending upon the extent to which the valve actuator 90 moves the valve spool 86, a greater or lesser portion of the fluid flow from the fixed displacement pump 28 may be permitted to flow through the first fluid bypass conduit 78, the bypass valve 38, and the second fluid bypass conduit 80 to the fluid return conduit 82 and the fluid reservoir 30.

The valve actuator 90 comprises a portion of the valve control apparatus 40 that controls operation of the bypass valve 38. The valve control apparatus 40 also comprises a piezoelectric chamber 92 and electrical lines 94 that electrically connect the piezoelectric chamber to the valve actuator 90. The piezoelectric chamber 92 includes or contains a piezoelectric member or piezoelectric sensor 95. The piezoelectric sensor 95 includes a layer 96 of a piezoelectric material overlying and supported on a layer 98 of resilient material. A fluid pressure sense conduit 100 fluidly connects the piezoelectric chamber 92 with the fluid supply conduit 36 from the fixed displacement pump 28. The fluid connection between the piezoelectric chamber 92 and the fluid pressure sense conduit 100 is such that the pressure in the fluid supply conduit 36 is applied to the piezoelectric sensor 95 and, more specifically, to the piezoelectric layer 96 in the piezoelectric chamber.

The resilient layer 98 of the piezoelectric sensor 95 and the piezoelectric chamber 92 permits the piezoelectric layer 96 to deflect or flex in response to pressure applied through the fluid pressure sense conduit 100. For example, the piezoelectric layer 96 may be immovably supported around its periphery such that application of pressure to a central portion of the piezoelectric layer produces deflection of the central portion and defection or compression of the underlying portion of the resilient layer 98. Changes in the fluid pressure within the fluid supply conduit 36 and thus within the fluid pressure sense conduit 100 produce flexing or changes in the amount of deflection of the piezoelectric layer 96. Flexing or changes in the amount of deflection of the piezoelectric layer 96 will produce a voltage across the piezoelectric layer and a flow of current through the electrical lines 94. Such a current may be used to operate the valve actuator 90.

As shown in FIG. 1, the fluid pressure sense conduit 100 is connected with the fluid supply conduit 36 at a location upstream of the fluid connection between the first fluid bypass conduit 78 and the fluid supply conduit. As an alternative, the fluid pressure sense conduit 100 may be connected with the fluid supply conduit 36 at a location downstream of the fluid connection between the first fluid bypass conduit 78 and the fluid supply conduit.

In operation of the steering system 10, the impeller (not shown) of the fixed displacement pump 28 is rotated by the vehicle engine 37. The impeller may comprise vanes (not shown) slidably or otherwise movably mounted in a rotor or hub. Adjacent vanes, together with the rotor, define pumping chambers. As the rotor is rotated, the vanes move radially inward and outward and draw hydraulic fluid into the pumping chambers and then force the hydraulic fluid out of the pumping chambers at a high pressure, providing pressurized fluid for the steering system 10.

The pumping motion of the vanes also produces pressure variations or pulses within the hydraulic fluid. The fluid pressure and pressure pulses generated by the fixed displacement pump 28 are communicated to the piezoelectric chamber 92 through the fluid supply conduit 36 and the fluid pressure sense conduit 100. The fluid pressure pulses produce flexing or changes in the amount of deflection of the piezoelectric layer 96 in the piezoelectric sensor 95 of the piezoelectric chamber 92. The flexing or changes in the amount of deflection of the piezoelectric layer 96 produce a voltage across the piezoelectric layer and a flow of current through the electrical lines 94. Values of one or more parameters of the current or electrical signal from the piezoelectric layer 196 are used to control operation of the valve actuator 190. In particular, the current is used to operate the valve actuator 90.

The piezoelectric chamber 92 and, more specifically, the piezoelectric sensor 95, in effect, monitors or obtains values of various parameters related to the fluid pressure pulses produced by the fixed displacement pump 28. The monitored parameters may include frequency, phase, and amplitude of the fluid pressure pulses. The power in the pressure pulses or pump ripple is dependent upon the frequency of the pulses. Because the fixed displacement pump 28 is driven faster in response to or due to faster engine speed, the frequency of and the power in the resulting pressure pulses increases with increasing engine speed. The electrical current produced by flexing or changes in deflection of the piezoelectric layer 96 of the piezoelectric sensor 95 in response to the more frequent fluid pressure pulses may be used to operate the valve actuator 90. The valve control apparatus 40, of which the piezoelectric sensor 95 is a component, thus controls operation of the bypass valve 38 in response to the values obtained by the sensor of at least one parameter related to the pressure pulses, such as the frequency of the pressure pulses. The valve control apparatus 40, of which the piezoelectric sensor 95 is a component, thus also controls operation of the bypass valve 38 in response to at least one parameter of the electrical signals produced by the piezoelectric sensor, which is, in turn, related to a parameter of the pressure pulses, such as the frequency of the pressure pulses.

Because the amount of current produced by the piezoelectric sensor 95 is proportional to or directly related to the frequency of the pressure pulses in the hydraulic fluid and, thus, to the speed of rotation of the pump impeller and the fluid flow from the fixed displacement pump 28, the extent to which the valve spool 86 is driven or pushed to an open position by the valve actuator 90 is also proportional to or directly related to the speed of rotation of the impeller and the fluid flow from the fixed displacement pump 28. The increased diversion of fluid flow from the fixed displacement pump 28 through the bypass valve 38 with increasing fluid flow from the fixed displacement pump produces a relatively constant fluid flow through the steering control valve 22 of the steering gear 12.

Figure 2:
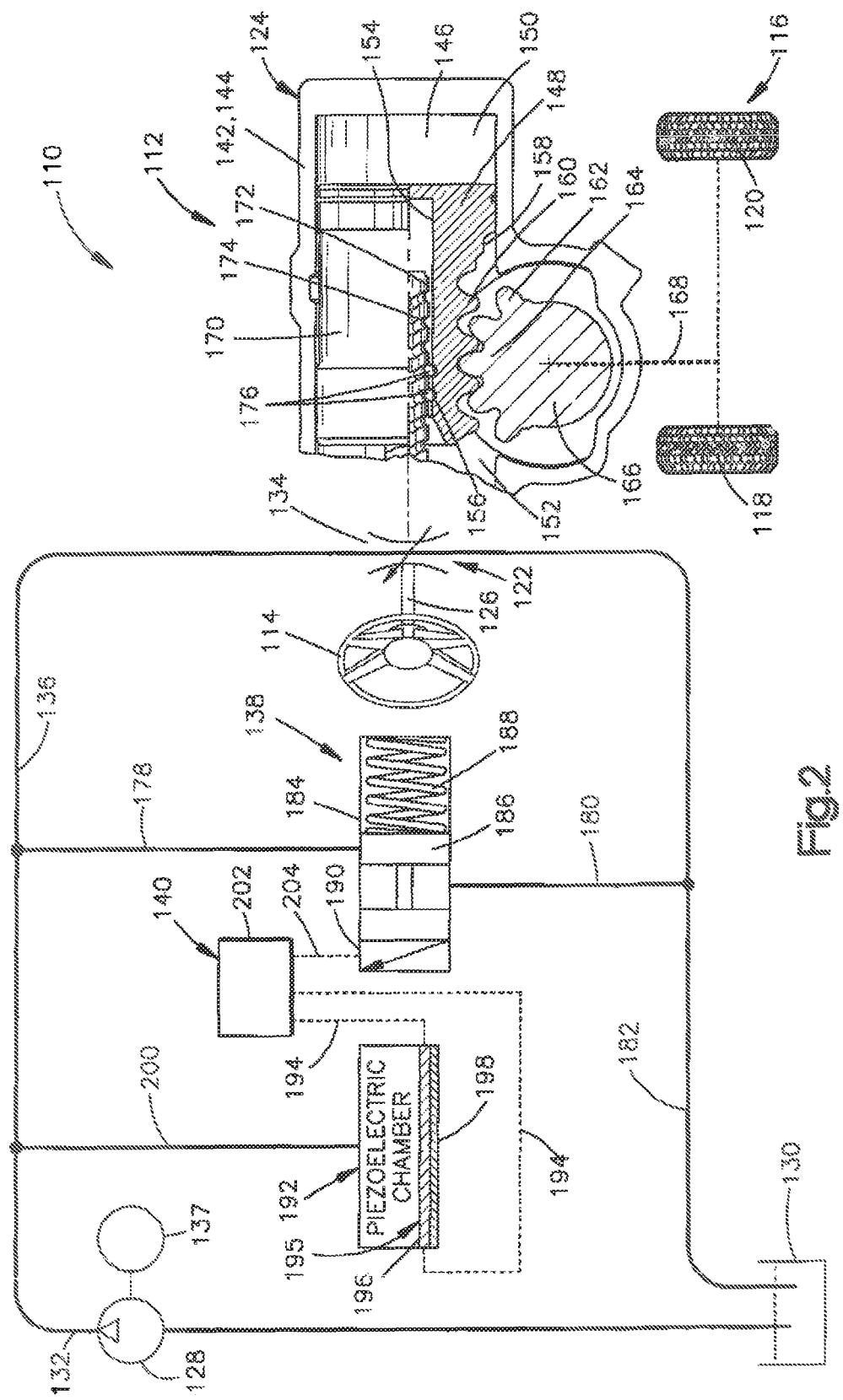
FIG. 2 is a schematic view of a steering system constructed in accordance with a second example embodiment of the present invention.

FIG. 2 illustrates a hydraulically assisted steering system 110 for a vehicle (not shown), in accordance with another example of the present invention. The hydraulically assisted steering system 110 comprises a hydraulic power steering gear 112 operatively connected to a manually rotatable vehicle steering wheel 114. The steering gear 112 is also operatively connected to a set 116 of steerable vehicle wheels 118 and 120. The steering gear 112 includes a steering control valve 122 and a hydraulic fluid motor 124. The vehicle steering wheel 114 is connected to the steering control valve 122 through a rotatable steering column assembly 126.

A fixed displacement pump 128 delivers pressurized hydraulic fluid to the steering gear 112 from a fluid reservoir 130. A fluid outlet 132 of the fixed displacement pump 128 is fluidly connected or connected in fluid communication with a fluid inlet 134 of the steering control valve 122 by a fluid supply conduit 136. The fixed displacement pump 128 is continuously driven by an engine 137 of the vehicle, during operation of the engine. Therefore, during operation of the engine 137, the fixed displacement pump 128 continuously supplies fluid under pressure to the steering gear 112.

A bypass valve 138 diverts a portion of the flow of pressurized fluid from the fixed displacement pump 128 away from the steering gear 112 and to the fluid reservoir 130 before the portion of the flow reaches the steering gear. The portion of the flow is diverted because the fixed displacement pump 128 is operated by the vehicle engine 137 and, therefore, delivers increased fluid flow to the fluid outlet 132 and the steering system 110 with increased engine speed. The increased fluid flow is not required by the steering system 110. A valve control apparatus 140 controls operation of the bypass valve 138 in a manner that will be described in greater detail below.

The steering gear 112 is an integral hydraulic power steering gear that incorporates both the hydraulic fluid motor 124 and the steering control valve 122. The steering control valve 122 is an open center valve. The steering control valve 122 directs hydraulic fluid flow to actuate the hydraulic fluid motor 124, as is known in the art.

The steering gear 112 includes a housing 142 that forms a hydraulic cylinder 144. The cylinder 144 defines an internal chamber 146 that receives a piston 148. The piston 148 divides the chamber 146 into a first chamber portion 150 and a second chamber portion 152. Together, the cylinder 144 and the piston 148 comprise the hydraulic fluid motor 124.

The piston 148 includes an inner surface 154 that defines a bore extending axially into the piston 148 from one end. The inner surface 154 includes a helical groove 156. The piston 148 also has an external surface 158 that includes a set of external teeth 160. The teeth 160 mesh with teeth 162 on a sector gear 164. The sector gear 164 is fixed to an output shaft 166, which extends outwardly from the housing 142. The output shaft 166 is connected to a pitman arm (not shown) which, in turn, is connected via a linkage 168 to the set 116 of steerable vehicle wheels 118 and 120 to steer the vehicle (not shown). As the piston 148 moves in the chamber 146, the output shaft 166 is rotated to operate the linkage 168, which turns the steerable vehicle wheels 118 and 120.

The steering control valve 122 directs the flow of pressurized hydraulic fluid received from the fixed displacement pump at the fluid inlet 134 of the steering control valve to one of the first and second chamber portions 150 and 152 to control the direction and amount of steering. As is known in the art, the steering control valve 122 comprises first and second valve members. The first valve member comprises a rotatable valve core (not shown). The second valve member comprises a rotatable valve sleeve 170. The valve core (not shown) is located coaxially within the valve sleeve 170 and is supported by the valve sleeve for limited rotation relative to the valve sleeve. The valve core is formed in one piece with a rotatable input shaft (not shown) of the steering gear 112.

As is also known in the art, the valve sleeve 170 is partially received within the bore of the piston 148. An outer surface 172 of the valve sleeve 170 includes a helical groove 174. The helical groove 174 of the valve sleeve 170 and the helical groove 156 of the piston 148 receive balls 176, which both mechanically connect the valve sleeve and the piston and also permit the valve sleeve to rotate relative to the piston. As a result, rotational movement of the valve sleeve 170 relative to the piston 148 produces axial longitudinal movement of the piston in the cylinder 142. Conversely, axial or longitudinal movement of the piston 148 in the cylinder 142 produces rotational movement of the valve sleeve 170 relative to the piston.

The steering control valve 122 is actuated by the rotatable steering column assembly 126, which is connected to the input shaft (not shown) of the steering gear 112. The rotatable steering column assembly 126 is rotated by the vehicle steering wheel 114. As is known in the art, rotation of the vehicle steering wheel 114 is transmitted via the steering column assembly 126 to the steering control valve 122 to cause relative rotation between the valve core (not shown) and the valve sleeve 170. When the valve core (not shown) is rotated relative to the valve sleeve 170, hydraulic fluid is ported or directed through grooves (not shown) and associated passages (not shown) in the valve core and valve sleeve to one of the first and second chamber portions 150 and 152, while hydraulic fluid is simultaneously vented or directed away from the other chamber portion. The steering control valve 122 is thus fluidly connected to or in fluid communication with the hydraulic fluid motor 124 such that the steering control valve directs pressurized fluid to the hydraulic fluid motor and allows fluid to return from the hydraulic fluid motor. Porting of the pressurized hydraulic fluid to one of the first and second chamber portions 150 and 152 and venting of hydraulic fluid from the other of the first and second chamber portions causes corresponding movement of the piston 148 (to the left or to the right, as viewed in FIG. 2).

As previously stated, the bypass valve 138 diverts a portion of the flow of pressurized fluid from the fixed displacement pump 128 away from the steering gear 112 and to the fluid reservoir 130 before the portion of the flow reaches the steering gear. The portion of the flow is diverted because the increased fluid flow from the fixed displacement pump 128 resulting from an increase in engine speed is not required by the steering system 110. The bypass valve 138 is interposed in fluid communication with a first fluid bypass conduit 178 and a second fluid bypass conduit 180. The first fluid bypass conduit 178 fluidly connects the bypass valve 138 with the fluid supply conduit 136 from the fixed displacement pump 128. The second fluid bypass conduit 180 fluidly connects the bypass valve 138 with a fluid return conduit 182 that is fluidly connected to or in fluid communication with the fluid reservoir 130.

As shown schematically in FIG. 2, the bypass valve 138 includes a valve housing 184 and a valve spool 186 that is movable lengthwise in the housing. A coil spring 188 disposed at one end of the valve spool 186 resiliently biases the valve spool in one lengthwise direction (to the left, as viewed in FIG. 2) in the valve housing 184. The valve spool 186 is thus resiliently biased to a closed position in which the valve spool blocks the flow of fluid from the first fluid bypass conduit 178 through the bypass valve 138. Adjacent the opposite end of the valve spool 186, an electrically operable valve actuator 190, such as a solenoid, operates to move the valve spool in an opposite lengthwise direction (to the right, as viewed in FIG. 2) in the valve housing 184 against the bias of the spring 188. The valve spool 186 is thus operated by the valve actuator 190 to an open position in which the valve spool allows a flow of fluid from the first fluid bypass conduit 178 to pass through the bypass valve 138. Depending upon the extent to which the valve actuator 190 moves the valve spool 186, a greater or lesser portion of the fluid flow from the fixed displacement pump 128 may be permitted to flow through the first fluid bypass conduit 178, the bypass valve 138, and the second fluid bypass conduit 180 to the fluid return conduit 182 and the fluid reservoir 130.

The valve actuator 190 comprises a portion of the valve control apparatus 140 that controls operation of the bypass valve 138. The valve control apparatus 140 also comprises a piezoelectric chamber 192 and electrical lines 194 that electrically connect the piezoelectric chamber to a microprocessor or controller 202. The piezoelectric chamber 192 includes or contains a piezoelectric member or piezoelectric sensor 195. The piezoelectric sensor 195 includes a layer 196 of a piezoelectric material overlying and supported on a layer 198 of resilient material. A fluid pressure sense conduit 200 fluidly connects the piezoelectric chamber 192 with the fluid supply conduit 136 from the fixed displacement pump 128. The fluid connection between the piezoelectric chamber 192 and the fluid pressure sense conduit 200 is such that the pressure in the fluid supply conduit 136 is applied to the piezoelectric sensor 195 and, more specifically, to the piezoelectric layer 196 in the piezoelectric chamber.

The resilient layer 198 of the piezoelectric sensor 195 and the piezoelectric chamber 192 permits the piezoelectric layer 196 to deflect or flex in response to pressure applied through the fluid pressure sense conduit 200. For example, the piezoelectric layer 196 may be immovably supported around its periphery such that application of pressure to a central portion of the piezoelectric layer produces deflection of the central portion and deflection or compression of the underlying portion of the resilient layer 198. Changes in the fluid pressure within the fluid supply conduit 136 and thus within the fluid pressure sense conduit 200 produce flexing or changes in the amount of deflection of the piezoelectric layer 196. Flexing or changes in the amount of deflection of the piezoelectric layer 196 will produce a voltage across the piezoelectric layer and a flow of current through the electrical lines 194. Such a current or electrical signal may be used to control operation of the valve actuator 190.

The controller 202 receives the electrical signal from the piezoelectric sensor 195 via the electrical lines 194. Based on the electrical signal from the piezoelectric sensor 195, the controller 202 generates an electrical signal, which is sent to the valve actuator 190 via electrical line 204. The electrical signal sent to the valve actuator 190 by the controller 202 has a value based on the values obtained by the piezoelectric sensor 195 of at least one parameter related to the pressure pulses, such as the frequency of the pressure pulses. The values obtained by the piezoelectric sensor 195 may be adjusted by values of other parameters, such as the rotational speed of the impeller of the pump 137, sensed by other sensors (not shown) and communicated to the controller 202.

In operation of the steering system 110, the impeller (not shown) of the fixed displacement pump 128 is rotated by the vehicle engine 137. The impeller may comprise vanes (not shown) slidably or otherwise movably mounted in a rotor or hub. Adjacent vanes, together with the rotor, define pumping chambers. As the rotor is rotated, the vanes move radially inward and outward and draw hydraulic fluid into the pumping chambers and then force the hydraulic fluid out of the pumping chambers at a high pressure, providing pressurized fluid for the steering system 110.

The pumping motion of the vanes also produces pressure variations or pulses within the hydraulic fluid. The fluid pressure and pressure pulses generated by the fixed displacement pump 128 are communicated to the piezoelectric chamber 192 through the fluid supply conduit 136 and the fluid pressure sense conduit 200. The fluid pressure pulses produce flexing or changes in the amount of deflection of the piezoelectric layer 196 in the piezoelectric sensor 195 of the piezoelectric chamber 192. The flexing or changes in the amount of deflection of the piezoelectric layer 196 produce a voltage across the piezoelectric layer and a flow of current through the electrical lines 194. Values of one or more parameters of the current or electrical signal from the piezoelectric layer 196 are used to control operation of the valve actuator 190.

The piezoelectric chamber 192 and, more specifically, the piezoelectric sensor 195, in effect, monitors or obtains values of various parameters related to the fluid pressure pulses produced by the fixed displacement pump 128. The monitored parameters may include frequency, phase, and amplitude of the fluid pressure pulses. The power in the pressure pulses or pump ripple is dependent upon the frequency of the pulses. Because the fixed displacement pump 128 is driven faster in response to or due to faster engine speed, the frequency of and the power in the resulting pressure pulses increases with increasing engine speed. The electrical current produced by flexing or changes in defection of the piezoelectric layer 196 of the piezoelectric sensor 195 in response to the more frequent fluid pressure pulses may be used to control operation of the valve actuator 190. The valve control apparatus 140, of which the piezoelectric sensor 95 is a component, thus controls operation of the bypass valve 138 in response to the values obtained by the sensor of at least one parameter related to the pressure pulses, such as the frequency of the pressure pulses. The valve control apparatus 140, of which the piezoelectric sensor 195 is a component, thus also controls operation of the bypass valve 138 in response to at least one parameter of the electrical signals produced by the piezoelectric sensor, which is, in turn, related to a parameter of the pressure pulses, such as the frequency of the pressure pulses.

Because the amount of current produced by the piezoelectric sensor 195 is proportional to or directly related to the frequency of the pressure pulses in the hydraulic fluid and, thus, to the speed of rotation of the pump impeller and the fluid flow from the fixed displacement pump 128, the extent to which the valve spool 186 is driven or pushed to an open position by the valve actuator 190 may be proportional to or directly related to the speed of rotation of the impeller and the fluid flow from the fixed displacement pump 128. The increased diversion of fluid flow from the fixed displacement pump 128 through the bypass valve 138 with increasing fluid flow from the fixed displacement pump produces a relatively constant fluid flow through the steering control valve 122 of the steering gear 112.

As shown in FIG. 2, the fluid pressure sense conduit 200 is connected with the fluid supply conduit 136 at a location upstream of the fluid connection between the first fluid bypass conduit 178 and the fluid supply conduit. As an alternative, the fluid pressure sense conduit 200 may be connected with the fluid supply conduit 136 at a location downstream of the fluid connection between the first fluid bypass conduit 178 and the fluid supply conduit.

From the above description of the invention, those skilled in the art will perceive improvements, changes and modifications. Such improvements, changes and modifications within the skill of the art are intended to be covered by the appended claims.

Having described the invention, the following is claimed:

1. A hydraulically assisted steering system for turning steerable wheels comprising:
    a steering gear operatively connected to a steering wheel and to a set of steerable wheels to effect turning of the steerable wheels in response to rotation of the steering wheel;
    a fixed displacement hydraulic pump fluidly connected to the steering gear to deliver a flow of pressurized fluid to the steering gear, the flow of pressurized fluid including pressure pulses produced by the pump;
    a bypass valve to divert a portion of the flow of pressurized fluid from the pump away from the steering gear before the portion of the flow reaches the steering gear; and
    valve control apparatus electrically connected to the bypass valve to control operation of the bypass valve, the valve control apparatus including a piezoelectric member to which the pressure pulses are applied, the piezoelectric member producing electrical signals in response to the applied pressure pulses, the valve control apparatus controlling operation of the bypass valve in response to at least one parameter of the electrical signals.

2. A hydraulically assisted steering system as set forth in claim 1, wherein the valve control apparatus operates the bypass valve using energy in the electrical signals.

3. A hydraulically assisted steering system as set forth in claim 2, wherein the valve control apparatus operates the bypass valve such that greater energy in the electrical signals causes the portion of the flow of pressurized fluid diverted away from the steering gear to be larger and such that less energy in the electrical signals causes the portion of the flow of pressurized fluid diverted away from the steering gear before the portion of the flow reaches the steering gear to be smaller.

4. A hydraulically assisted steering system as set forth in claim 1, wherein the valve control apparatus operates the bypass valve in accordance with frequency of the electrical signals.

5. A hydraulically assisted steering system as set forth in claim 4, wherein the valve control apparatus operates the bypass valve such that if the electrical signals have a higher frequency, the portion of the flow of pressurized fluid diverted away from the steering gear is larger and, if the electrical signals have a lower frequency, the portion of the flow of pressurized fluid diverted away from the steering gear before the portion of the flow reaches the steering gear is smaller.

6. A hydraulically assisted steering system for turning steerable wheels comprising:
    a steering gear operatively connected to a steering wheel and to a set of steerable wheels to effect turning of the steerable wheels in response to rotation of the steering wheel;
    a fixed displacement hydraulic pump fluidly connected to the steering gear to deliver a flow of pressurized fluid to the steering gear, the flow of pressurized fluid including pressure pulses produced by the pump;
    a bypass valve to divert a portion of the flow of pressurized fluid from the pump away from the steering gear before the portion of the flow reaches the steering gear; and
    valve control apparatus electrically connected to the bypass valve to control operation of the bypass valve, the valve control apparatus including a sensor to obtain values of at least one parameter related to the pressure pulses, the valve control apparatus producing electrical signals in response to the values obtained by the sensor, the valve control apparatus controlling operation of the bypass valve in response to the values obtained by the sensor.

7. A hydraulically assisted steering system as set forth in claim 6, wherein the valve control apparatus operates the bypass valve using energy in the electrical signals.

8. A hydraulically assisted steering system as set forth in claim 7, wherein the valve control apparatus operates the bypass valve such that greater energy in the electrical signals causes the portion of the flow of pressurized fluid diverted away from the steering gear to be larger and such that less energy in the electrical signals causes the portion of the flow of pressurized fluid diverted away from the steering gear before the portion of the flow reaches the steering gear to be smaller.

9. A hydraulically assisted steering system as set forth in claim 8, wherein the valve control apparatus operates the bypass valve in accordance with frequency of the pressure pulses.

10. A hydraulically assisted steering system as set forth in claim 9, wherein the valve control apparatus operates the bypass valve such that if the pressure pulses have a higher frequency, the portion of the flow of pressurized fluid diverted away from the steering gear is larger and, if the pressure pulses have a lower frequency, the portion of the flow of pressurized fluid diverted away from the steering gear before the portion of the flow reaches the steering gear is smaller.

11. A hydraulically assisted steering system as set forth in claim 6, wherein the sensor includes a piezoelectric member.

12. A hydraulically assisted steering system as set forth in claim 11, wherein the pressure pulses are applied to the piezoelectric member, the piezoelectric member producing electrical signals in response to the applied pressure pulses.

\* \* \* \* \*